(12) United States Patent
Yashiro et al.

(10) Patent No.: US 6,541,758 B2
(45) Date of Patent: Apr. 1, 2003

(54) LIQUID-LEVEL GAUGE

(75) Inventors: Takamasa Yashiro, Tokyo (JP); Satoshi Mochizuki, Tokyo (JP); Takaharu Yoshitomi, Tokyo (JP)

(73) Assignee: NTT Advanced Technology Corporation (JP)

( * ) Notice: Subject to any disclaimer, the term of this patent is extended or adjusted under 35 U.S.C. 154(b) by 23 days.

(21) Appl. No.: 09/912,590

(22) Filed: Jul. 24, 2001

(65) Prior Publication Data

US 2002/0130253 A1 Sep. 19, 2002

(30) Foreign Application Priority Data

Mar. 15, 2001 (JP) .......................................... 2001-074983

(51) Int. Cl.[7] .............................. G01J 5/08; G01F 23/30; G02B 6/00
(52) U.S. Cl. ..................... 250/227.14; 73/305; 73/315; 385/13
(58) Field of Search .......................... 250/227.14, 573, 250/577, 227.11, 227.25; 73/290, 305, 309, 293, 313, 315, 319; 385/13, 12; 356/477

(56) References Cited

U.S. PATENT DOCUMENTS

| | | | | |
|---|---|---|---|---|
| 4,691,113 A | * | 9/1987 | Corvazier et al. | |
| 5,182,779 A | * | 1/1993 | D'Agostino et al. | |
| 5,303,586 A | * | 4/1994 | Zhao et al. | |
| 5,331,850 A | * | 7/1994 | Loos | |
| 5,686,986 A | * | 11/1997 | Li et al. | |
| 6,026,683 A | * | 2/2000 | Lee | |

FOREIGN PATENT DOCUMENTS

| | | |
|---|---|---|
| JP | 10-148565 | 6/1998 |
| JP | 10-197617 | 7/1998 |
| JP | 11-023346 | 1/1999 |
| JP | 11-030544 | 2/1999 |
| JP | 11-326015 | 11/1999 |
| JP | 2000-088629 | 3/2000 |
| JP | 2000-097750 | 4/2000 |

* cited by examiner

*Primary Examiner*—David Porta
*Assistant Examiner*—David C. Meyer
(74) *Attorney, Agent, or Firm*—Blakely Sokoloff Taylor & Zafman

(57) ABSTRACT

There is provided a liquid-level gauge for accurately measuring a liquid-level height of fluid to be measured. In the liquid-level gauge, a float having a uniform cross-sectional form in the height direction and a specific weight value small than that of liquid is dipped in the liquid. The float is supported by an optical fiber at a constant height such that its upper end always projects from the liquid level. One end of the optical fiber is connected to an optical fiber strain gauge and a strain detector is turned round between fiber support members. When the float receives buoyancy from the liquid, tension is applied to the strain detector of optical fiber to generate strain therein. By detecting the strain by means of an optical fiber strain gauge, a liquid-level height can be measured.

4 Claims, 8 Drawing Sheets

LIQUID-LEVEL GAUGE

BACKGROUND OF THE INVENTION

The present invention relates to a liquid-level gauge for measuring a height of liquid level and more particularly, to a liquid-level gauge for measuring a liquid-level height by generating strain in an optical fiber by the action of vertically upward force a body dipped in liquid receives from the liquid (buoyancy) and measuring the strain.

Liquid-level gauges for measurement of a height of liquid level based on various principles have hitherto been proposed. For example, an electrostatic capacitance type liquid-level gauge (JP-A-2000-097750 or JP-A-11-030544), a barometric liquid-level gauge (JP-A-2000-088629), a float type liquid-level gauge (JP-A-10-148565 or JP-A-11-326015), an electrode type liquid-level gauge (JP-A-11-023346) and an electric wave type liquid-level gauge (JP-A-10-197617) have been known. Specifically, the present invention provides a float type or comparable type liquid-level gauge, especially, using an optical fiber.

The float type liquid-level gauge detects a height of a float that ascends/descends as the liquid-level changes and it is classified into two kinds of which one uses a magnet and reed switches and the other uses a wire or a tape. The former float type liquid-level gauge has a number of reed switches arrayed in the liquid-level height direction and they are operated by the magnet as the float ascends or descends to measure a height at which a reed switch is turned on, as a liquid-level height. On the other hand, in the latter float type liquid-level gauge, a measuring wire attached to a float is wound up on a drum to calculate a liquid-level height from a windup amount.

SUMMARY OF THE INVENTION

In the conventional liquid-level gauge, especially, the float type liquid-level gauge using a magnet and a plurality of reed switches, however, it is necessary that the magnet be built in the float and a great number of reed switches be incorporated in guide pipes for guiding the float, raising a problem that the number of parts increases and the structure is complicated.

On the other hand, in the float type liquid-level gauge using a wire, many parts such as a windup drum for the wire, a windup motor and a pulley are needed, so that the gauge is increased in scale and is often troubled because of mechanical windup, thus requiring laborious and time-consuming work for repairs and maintenance.

Under the circumstances, the present inventors have studied and conducted experiments in various ways by noticing a change in buoyancy which a body receives from liquid as the liquid-level height changes in the float type or comparable type (suspension type) liquid-level gauge to confirm that the liquid-level height can be measured by detecting the change in buoyancy as a change in strain in an optical fiber.

The present invention has been made in the light of the conventional problems and the results of experiments and it is an object of the invention to provide a liquid-level gauge which can measure a liquid-level height accurately by detecting a change in buoyancy acting on a columnar body dipped vertically in liquid that is caused by a change in liquid-level height, as a change in strain generated in an optical fiber.

To accomplish the above object, a liquid-level gauge according to a first invention comprises a float having a uniform cross-sectional form in the height direction and dipped in liquid, an optical fiber having a support portion of a predetermined length that is applied with tension by supporting the float in such a manner that its upper end always projects from the liquid level, an optical fiber strain gauge for detecting a strain level generated in the support portion of the optical fiber in accordance with a change in liquid-level height, and fiber support members provided at a position engaging the top of the float and a position below the float, respectively, wherein the support portion of the optical fiber is turned round between the fiber support members.

In a liquid-level gauge according to a second invention depending on the first invention, the support portion of the optical fiber is turned round plural times between the fiber support members.

A liquid-level gauge according to a third invention comprises a float having a uniform cross-sectional form in the height direction and dipped in liquid, an optical fiber having a support portion of a predetermined length that is applied with tension by supporting the float in such a manner that its upper end always projects from the liquid level, an optical fiber strain gauge for detecting strain generated in the support portion of the optical fiber in accordance with a change in liquid-level height, and fiber support members provided at a position engaging the top of the float and a position below the float, respectively, wherein the support portion of the optical fiber is formed into a loop form between the fiber support members and fixed at its opposite ends by means of a lock member.

In a liquid-level gauge according to a fourth invention depending on the third invention, the optical fiber support portion is turned round plural times between the fiber support members so as to be formed into a loop form.

A liquid-level gauge according to a fifth invention comprises a dipping member having a uniform cross-sectional form in the height direction and dipped in liquid, a wire for supporting or suspending the dipping member in such a manner that its upper end always projects from the liquid level, an optical fiber having a portion of a predetermined length that is applied with tension generated in the wire, and an optical fiber strain gauge for detecting strain generated in the portion of optical fiber applied with the tension, wherein the portion of the optical fiber applied with the tension is laid along the wire and its opposite ends are fixed to the wire.

In a liquid-level gauge according to a sixth invention depending on the fifth invention, a portion of the wire across which the optical fiber is fixed is slackened.

In a liquid-level gauge according to a seventh invention depending on the fifth or sixth invention, the dipping member is a float having a specific weight value smaller than that of the liquid.

In a liquid-level gauge according to an eighth invention depending on the fifth or sixth invention, the dipping member is a suspension member having a specific weight value larger than that of the liquid.

In the first to eighth inventions, when the liquid-level height changes, the magnitude of buoyancy either the float or the suspension member receives from liquid also changes. Since the cross-sectional area of the float or suspension member is uniform in the longitudinal direction, the value of a change in liquid-level height is accurately proportional to a change in the buoyancy acting on the float or suspension member. Also, a change in strain in the optical fiber is accurately proportional to the change in the buoyancy. In the case of the float, as the liquid-level height rises to increase the buoyancy acting on the float, the optical fiber or wire supporting the float is tensed. Accordingly, tension applied to the optical fiber or wire increases in proportion to the buoyancy to increase strain generated in the optical fiber. In the case of the suspension member, as the liquid-level height rises to increase the buoyancy acting on the suspension member, tension applied to the wire suspending the suspension member decreases in inverse proportion to an increase in the buoyancy to thereby decrease strain generated in the optical fiber. Accordingly, by detecting strain generated in the optical fiber in accordance with a change in buoyancy by means of the optical fiber strain gauge, a liquid-level height can be measured accurately from the correlation between the liquid-level height and the buoyancy.

In the first to fourth inventions, the support portion of optical fiber is turned round or looped so that its apparent length may be shortened to permit the gauge to be reduced in size. More particularly, the support portion of optical fiber that receives tension to generate strain therein during strain measurement based on the optical fiber and for detection of the strain, the support portion is required to have a length of at least about 1.5 m. If the support portion is dipped vertically in liquid, the height of the gauge is increased and increase the size of the gauge. Thus, by turning round or looping the support portion, the vertical apparent length of the support portion can be approximately halved and the gauge can be reduced in size. With the support portion turned round or looped, the float can be supported by two optical fibers and so applied load per one fiber can be reduced. Further, by turning round the support portion plural times, the apparent length of the support portion can be shortened by the number of turns to thereby further reduce the size of the gauge.

In the fifth to eighth invention, the optical fiber can be arranged such that it is spaced apart from the dipping member. Accordingly, the optical fiber need not be dipped in the liquid with the dipping member but can be laid at a location of good environmental condition such as atmosphere, bringing about an advantage that erosion, deterioration and contamination of the optical fiber due to the liquid can be prevented.

In the sixth invention, the wire is partly slackened to prevent the optical fiber from being applied with excessive tension.

The present invention is not limited to measurement of the liquid-level height of water but can be used for measuring the liquid-level height of various kinds of liquid such as oil and medicine.

DESCRIPTION OF THE PREFERRED EMBODIMENTS

The present invention will be now be detailed by way of example with reference to the accompanying drawings.

Figure 2:
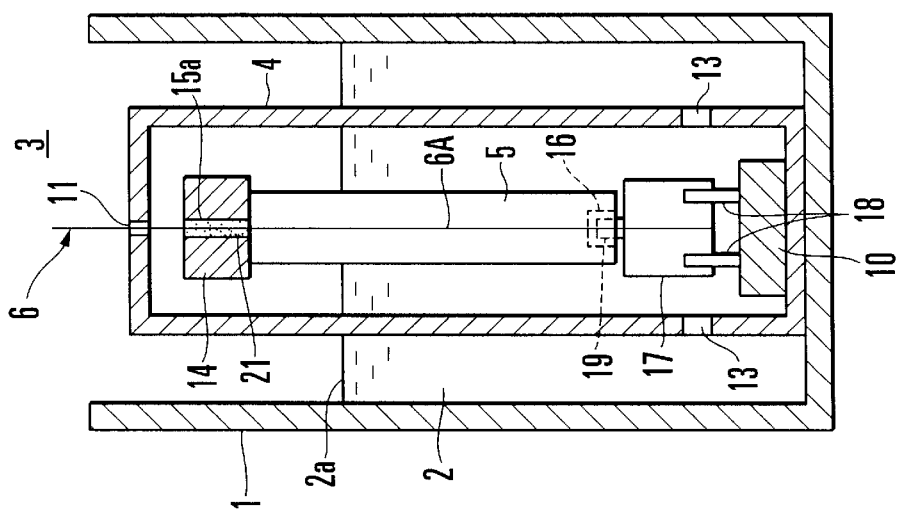
FIG. 2 is a sectional view taken on line II—II of FIG. 1.
Figure 1:
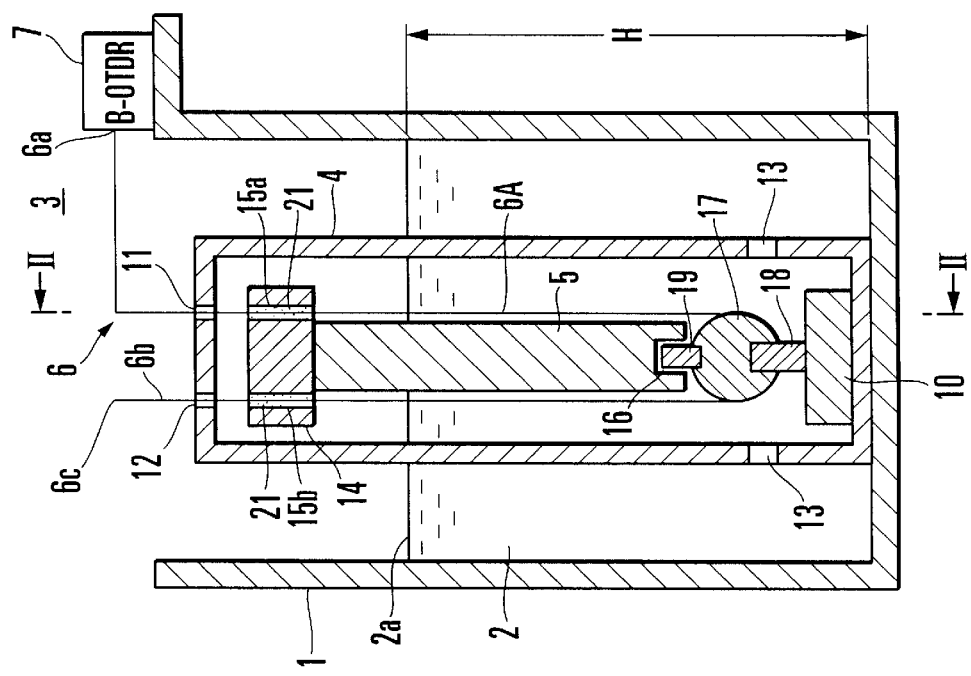
FIG. 1 is a sectional view showing a first embodiment in which the invention is applied to a float type liquid-level gauge.

Referring first to FIG. 1, a first embodiment of a float type liquid-level gauge of the invention is illustrated in sectional form. FIG. 1 is sectioned on line II—II as shown in FIG. 2. In these figures, an open vessel 1 stores liquid 2 representing an object to be measured and a liquid-level gauge 3 is adapted to measure a height of liquid level 2a (liquid-level height) of the liquid 2.

The liquid-level gauge 3 comprises a sleeve 4 arranged in the vessel 1, a float 5 dipped in the liquid 2 inside the sleeve 4, an optical fiber 6 supporting the float 5 to keep it at a constant height, and an optical fiber strain gauge 7, as represented by a Brillouin-optical time domain reflectometer (B-OTDR), disposed on the vessel.

The sleeve 4 takes a cylindrical form having its top end protruding upwardly of the liquid 2 and its lower bottom end fixed to the bottom of the vessel 1 by means of a fixing member 10. The interior of the sleeve 4 is opened to atmosphere through two holes 11 and 12 for fiber formed in the top and the sleeve 4 is formed, at its lower periphery, with a plurality of liquid inlet holes 13 for admitting the liquid 2 to the inside. The number and size of the liquid inlet holes 13 are optional and suitably changeable and will not be designated particularly.

The sleeve 4 is made of any material that cannot be eroded by the liquid 2, such as plastics, metal, ceramics, wood or the like. The sleeve can take any suitable form other than the cylindrical one, for example, a hurdle form, a blind form or a net form having a structure that permits the liquid 2 to pass therethrough.

In the case of the float type liquid-level gauge 3, the sleeve 4 is used to prevent upside-down motion of the float 5 when the liquid level 2a of liquid 2 lowers until most of the float 5 projects from the liquid level 2a. Therefore, the sleeve is not limited to the cylindrical form that accommodates the whole of the float 5 but may be constructed of two guide members for vertically movably guiding only the upper and lower ends of the float 5, respectively. In short, the sleeve 4 may take any desired form that can prevent upside-down motion of the float 5.

The float 5 is made of a material having a specific weight value less than that of the liquid 2 such as, for example, wood or plastics and formed into a bar or cylinder having a cross-sectional form that is uniform in the height direction. The float 5 has a length sufficient to cover a change range of the liquid level 2a of liquid 2 and is dipped in the liquid 2 in such a manner that its upper end projects from the maximum height of the liquid level 2a. At the upper end projecting from the liquid level 2a, the float 5 is integrally mounted with a fiber support member 14 including two fiber fixing pipes 15a and 15b and in the bottom center, it is formed with a recess 16.

A fiber support member 17 different from the fiber support member 14 is arranged above the fixing member 10 through the medium of mount members 18 so as to be positioned substantially directly below the float 5. The fiber support member 17 is formed into a column having its outer diameter larger than that of the float 5, fixedly secured to the mount members 18 such that its axis line is kept horizontally, and provided with a boss 19 to be inserted in the recess 16 of the float 5 to thereby regulate back and forth/side to side movement of the float 5.

The optical fiber 6 is adapted to support the float at a constant height and used as a sensor for detecting the liquid-level height. The optical fiber 6 has one end 6a connected to the B-OTDR 7. The optical fiber 6 runs into the sleeve 4 through the small hole 11 and runs through the fixing pipe 15a while being fixed to the fixing pipe 15a with bonding agent 21. Its portion lower than the pipe 15a is dipped in the liquid 2 along the peripheral surface of the float 5 and caused to coil round the bottom of the fiber support member 17 so as to be turned around upwards and passed through the other fiber fixing pipe 15b from below while being fixed to the fixing pipe 15b with bonding agent 21, so that a termination end 6b projects from the small hole 12 upwardly of the sleeve 4. Accordingly, a portion 6A of optical fiber 6 starting from the lower end of the fiber fixing pipe 15a and terminating at the fiber fixing pipe 15b has an intermediate part held and turned around by the lower fiber support member 17 and the portion 6A forms a support portion for supporting the float 5. This support portion 6A also serves as a portion that receives tension caused by buoyancy acting on the float 5 to generate strain inside of its own, thus forming a strain detector. Therefore, the strain detector 6A has a length necessary for strain detection of, for example, about 1.5 m. In order that an intermediate portion of the optical fiber 6 is fixed at two sites by means of the fiber fixing pipes 15a and 15b and turned round by means of the fiber support member 17 to enable the portion between the two pipes 15a and 15b to act as the strain detector 6A, the strain detector 6A is so fixed as not to be slackened and not to be applied with initial tension. In addition, the strain detector 6A receives tension and therefore, it is preferable that the strain detector 6A should not contact the float 5. A terminate end 6c of the optical fiber 6 is applied with a reflection preventive process by coating silicone oil.

The optical fiber 6 may be a solid wire but this is not limitative and if there is a possibility that the solid wire will be broken, the optical fiber 6 may preferably be an optical filer tape, an optical fiber chord or another type used integrally with a member for protection and reinforcement of the optical fiber 6.

The B-OTDR 7 is a unit for measuring strain distribution or loss distribution in the longitudinal direction of the optical fiber by detecting and analyzing natural Brillouin scattering light, back Rayleigh scattering light or Brillouin amplified light in the optical fiber.

Figure 3:
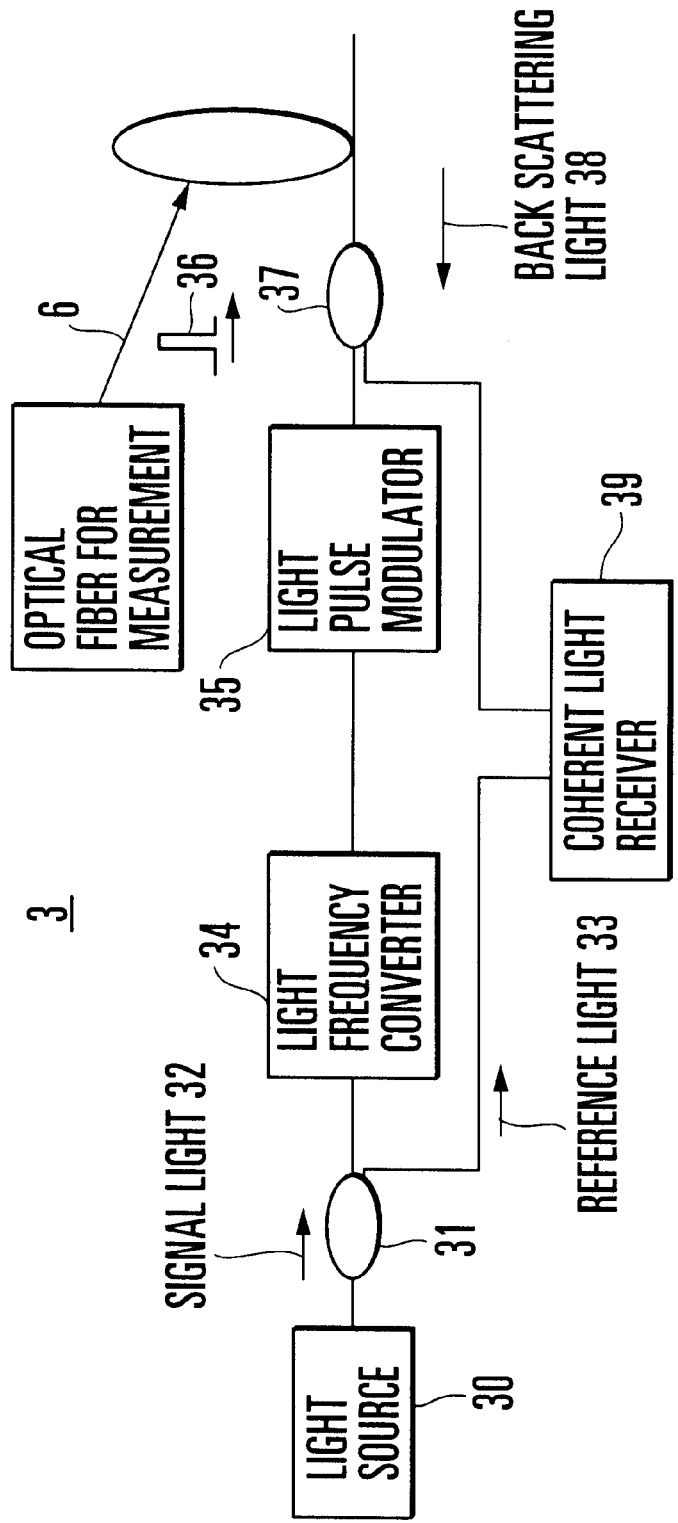
FIG. 3 is a diagram showing the fundamental construction of an optical fiber strain gauge.

Fundamental construction of the B-OTBR 7 is shown in FIG. 3.

The B-OTDR 7 includes a coherent light source 30 for emitting continuous light of narrow spectrum line width, a light directional coupler 31 for branching the continuous light emitted from the coherent light source (laser light source) 30 to signal light 32 and reference light 33 and a light frequency converter 34 for changing the signal light 32 in light frequency stepwise on time series base and converting it into a light pulse train having a time width of about 2 $\mu$sec (light frequency conversion). The B-OTDR 7 further includes a light pulse modulator 35 for converting the light pulse train into a light pulse 36 having a time width of about 10 nsec to 1 $\mu$sec, a light directional coupler 37 for causing the light pulse 36 to be incident on the optical fiber 6 and a coherent light receiver 39 for receiving the incident reference light 33 from the light directional coupler 31 and receiving incident back scattering light 38 such as due to Rayleigh scattering and Brillouin scattering generated in the optical fiber 6 through the light directional coupler 37.

The Brillouin scattering light is one of scattering light rays generated when light travels through a medium (optical fiber). When the light is scattered, it is shifted relative to incident light by a frequency inherent to the medium of the optical fiber and in the presence of changes in strain or temperature, the shift amount changes in proportion to the strain in the optical fiber or temperature. Accordingly, by detecting an amount of change in the Brillouin frequency shift, strain applied to the optical fiber can be measured continuously in the longitudinal direction. Since an amount of change in frequency shift due to temperature change is very smaller than the change amount due to strain change (0.002%/° C.), the influence of temperature can be neglected when the temperature change is small (about 5° C.) during measurement of the amount of change in Brillouin frequency shift due to strain.

The principle of measurement by the liquid-level gauge 3 according to the invention will now be described with reference to FIGS. 1 and 2.

Firstly, the float 5 supported by the fiber 6 is arranged in the sleeve 4 and dipped in the liquid 2 together with the sleeve 4 which in turn is fixed to the bottom of the vessel 1 by means of the fixing member 10. When dipped in the liquid 2, the float 5 receives upward force, that is, buoyancy from the liquid 2. This buoyancy equals weight of liquid 2 excluded by the float 5. Consequently, tension is applied to the strain detector 6A of the optical fiber 6 supporting the float 5 and strain is generated inside the strain detector 6A. As the liquid-level height 2a changes, the magnitude of the buoyancy acting on the float 5 also changes. Therefore, the tension applied to the strain detector 6A and the strain generated in the detector also change in proportion to the magnitude of the buoyancy. More particularly, when the liquid-level height rises to increase the buoyancy, larger tension is applied to the strain detector 6A to increase the strain generated in the strain detector 6A. Contrarily, when the liquid-level height lowers to decrease the buoyancy, the tension applied to the strain detector 6A is lessened to decrease the strain generated in the strain detector 6A.

Since the cross-sectional area of the float 5 (also of the optical fiber 6) is uniform in the longitudinal direction, the change amount of the liquid-level height 2a of liquid 2 is accurately proportional to the change in buoyancy acting on the float 5. Also, the changes in tension applied to the strain detector 6A and in strain are accurately proportional to the change in buoyancy. The change in strain is then measured by means of the B-OTDR 7. More particularly, as shown in FIG. 3, continuous light of narrow spectrum line width emitted from the coherent light source 30 is branched to signal light 32 and reference light 33 by means of the light directional coupler 31. The signal light 32 is changed in light frequency stepwise on time series base and converted into a light pulse train having a time width of about 2 $\mu$sec (light frequency conversion) by means of the light frequency converter 34, and further converted into a light pulse 36 having a time width of about 10 nsec to 1 $\mu$sec by means of the light pulse modulator 35 and thereafter caused to be incident on the optical fiber 6 via the light directional coupler 37. The light pulse 36 coming into the optical fiber 6 undergoes Rayleigh scattering and Brillouin scattering due to strain in the strain detector 6A of the optical fiber 6 to generate back scattering light 38. The back scattering light 38 is caused to be incident on the coherent light receiver 39 via the light directional coupler 37. On the other hand, the reference light 33 is also incident on the coherent light receiver 39 and the two light rays are subjected to a signal processing to detect a change in strain in the strain detector 6A.

In this case, the intensity of the back scattering light 38 in the Brillouin scattering is so weak as to amount to about $1/100$ of that of the Rayleigh scattering light but by adopting the coherent detection technique and light frequency conversion technique, the Brillouin scattering light in the optical fiber 6 can be detected with high accuracy. This type of B-OTDR 7 for measurement of strain in the optical fiber has hitherto been known (for example, JP-A-10-90121, JP-A-9-89714, JP-A-5-231923 and JP-A-10-197298) and a commercially available one can be used.

In measurement, changes in strain in the strain detector 6A of the optical fiber 6 and changes in liquid-level height are measured in advance through experiments and correlation therebetween is determined. Then, after a change in strain is measured by means of the B-OTDR 7, a liquid-level height corresponding to the measured value is read from the correlation, thereby ensuring that liquid-level height H of the liquid 2 can be measured.

In the embodiment set forth so far, the strain in the optical fiber 6 is detected using the B-OTDR 7 but this type of detection is not limitative and measurement can be effected using an optical fiber strain gauge based on the different principle, for example, an optical fiber strain gauge using the fiber Bragg grating (hereinafter abbreviated as FBG) method. The FBG method uses a detecting element using an optical fiber whose core portion has the refractive index that changes periodically in the fiber axis direction and in the FBG method, of light rays coming into the detecting element, only a ray of a specified wavelength corresponding to the period of the refractive index (Bragg wavelength) is selectively reflected at a fiber grating. When strain is applied to the detecting element, the period of the fiber grating changes and as a result, the frequency of reflection light shifts. The amount of shift changes in proportion to a strain level in the optical fiber. Accordingly, by determining an amount of change in frequency shift in the Bragg reflection, the strain in the optical fiber can be measured.

In the liquid-level gauge 3 as above, the strain detector 6A is turned round by the fiber support member 17 and therefore, in comparison with the linear arrangement, the geometrical dimension in height direction of the float 5 and strain detector 6A can approximately be halved to reduce the volume of the sensor portion of the liquid-level gauge 3. Contrarily, in case the total length of the strain detector 6A is desired to be prolonged, a longer strain detector can be implemented by taking advantage of the turn-round structure without changing the volume of the gauge per se.

Further, when the strain detector 6A is turned round at the fiber support member 17, the float 5 can apparently be supported by two optical fibers laid on both sides of the float 5 and as a result, loading per one fiber can be reduced to prevent breakage of the optical fiber 6.

Figure 4:
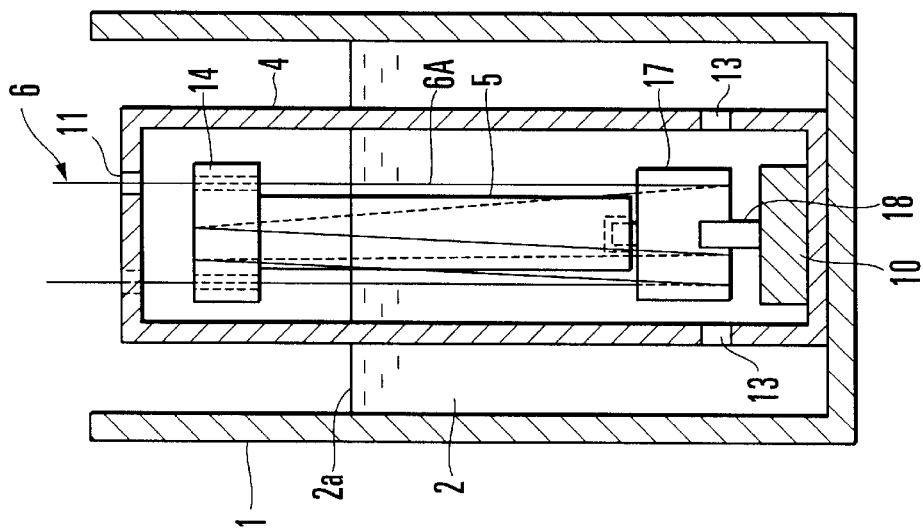
FIG. 4 is a sectional view showing a float type liquid-level gauge according to a second embodiment of the invention.
Figure 5:
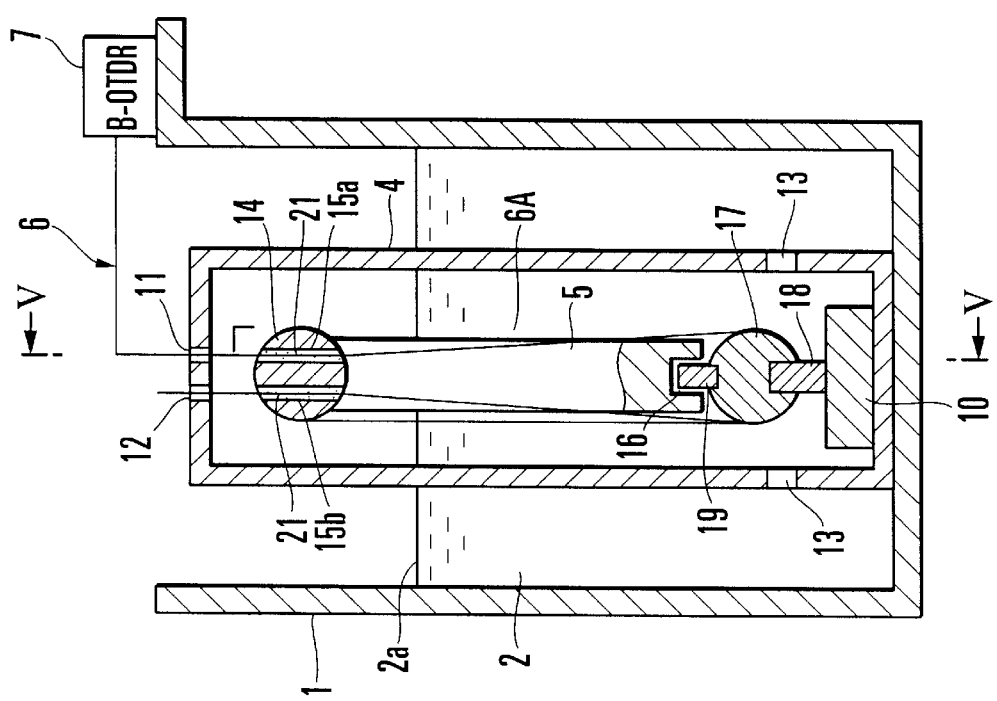
FIG. 5 is a sectional view taken on V—V line of FIG. 4.

Referring to FIG. 4, a second embodiment of the float type liquid-level gauge of the invention is illustrated in sectional form. FIG. 5 is a longitudinal sectional diagram taken on line V—V of FIG. 4.

In the present embodiment, a strain detector 6A of optical fiber 6 is turned round three times between two fiber support members 14 and 17. Accordingly, the upper fiber support member 14 is made to be columnar like the lower fiber support member 17 and is disposed horizontally on the top surface of a float 5, so that the optical fiber 6 can be turned round on the upper side. The other structure is the same as that of the aforementioned first embodiment and therefore, identical components to those in the first embodiment are designated by identical reference numerals and will not be described herein.

With the construction as above, the apparent length of the strain detector 6A can be shortened by the number of turn-round operations to bring about advantages that the gauge can further be reduced in size and load per optical fiber can further be reduced.

Figure 6:
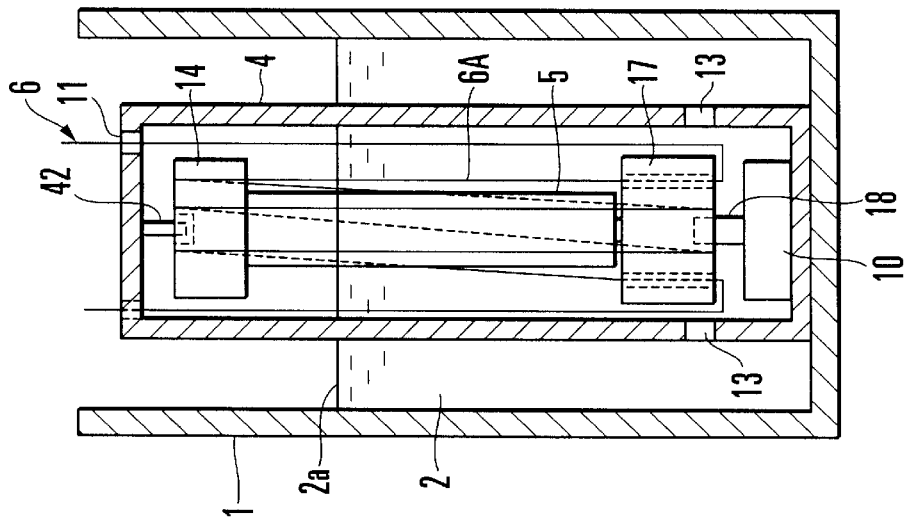
FIG. 6 is a sectional view showing a float type liquid-level gauge according to a third embodiment of the invention.
Figure 7:
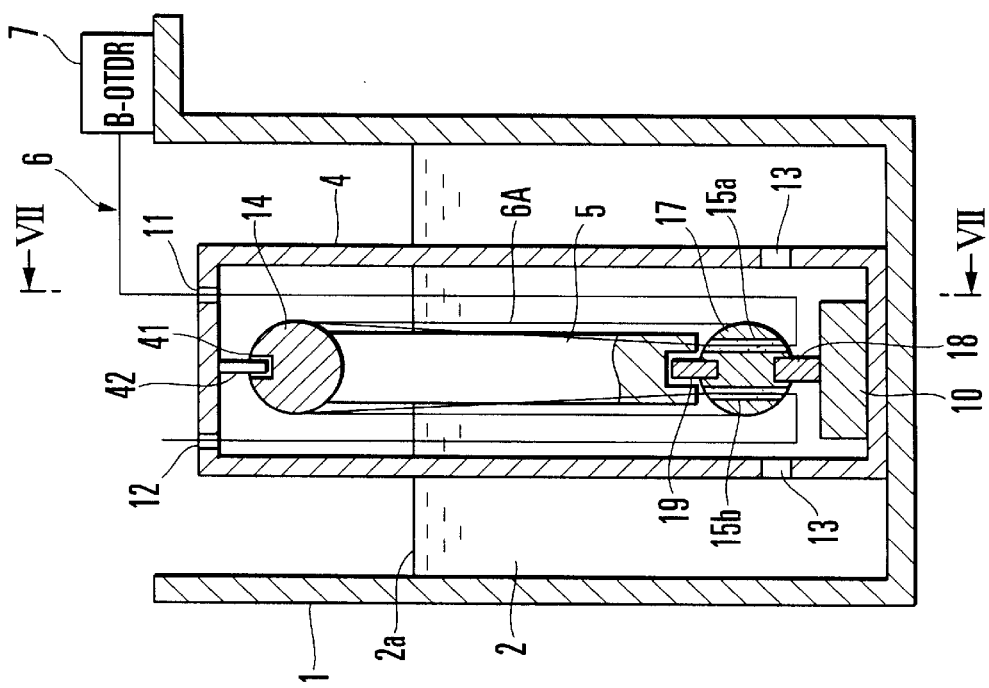
FIG. 7 is a sectional view taken on line VII—VII of FIG. 6.

Referring to FIG. 6, a third embodiment of the float type liquid-level gauge of the invention is illustrated in sectional form. FIG. 7 is a longitudinal sectional view taken on line VII—VII of FIG. 6.

In the present embodiment, fiber fixing pipes 15a and 15b for fixing the opposite ends of a strain detector 6A of optical fiber 6 are provided for a lower fiber support member 17 and the strain detector 6A is turned round three times between the lower fiber support member 17 and an upper fiber support member 14. The upper fiber support member 14 is made to be columnar and disposed horizontally on the top surface of a float 5, having a recess 41 formed in its upper surface, and a boss 42 provided to a sleeve 4 engages the recess 41 to cooperates with a lower boss 19 for the sake of preventing the float 5 from falling down.

Obviously, with the structure as above, too, the same effects as those in the second embodiment can be obtained.

Figure 8:
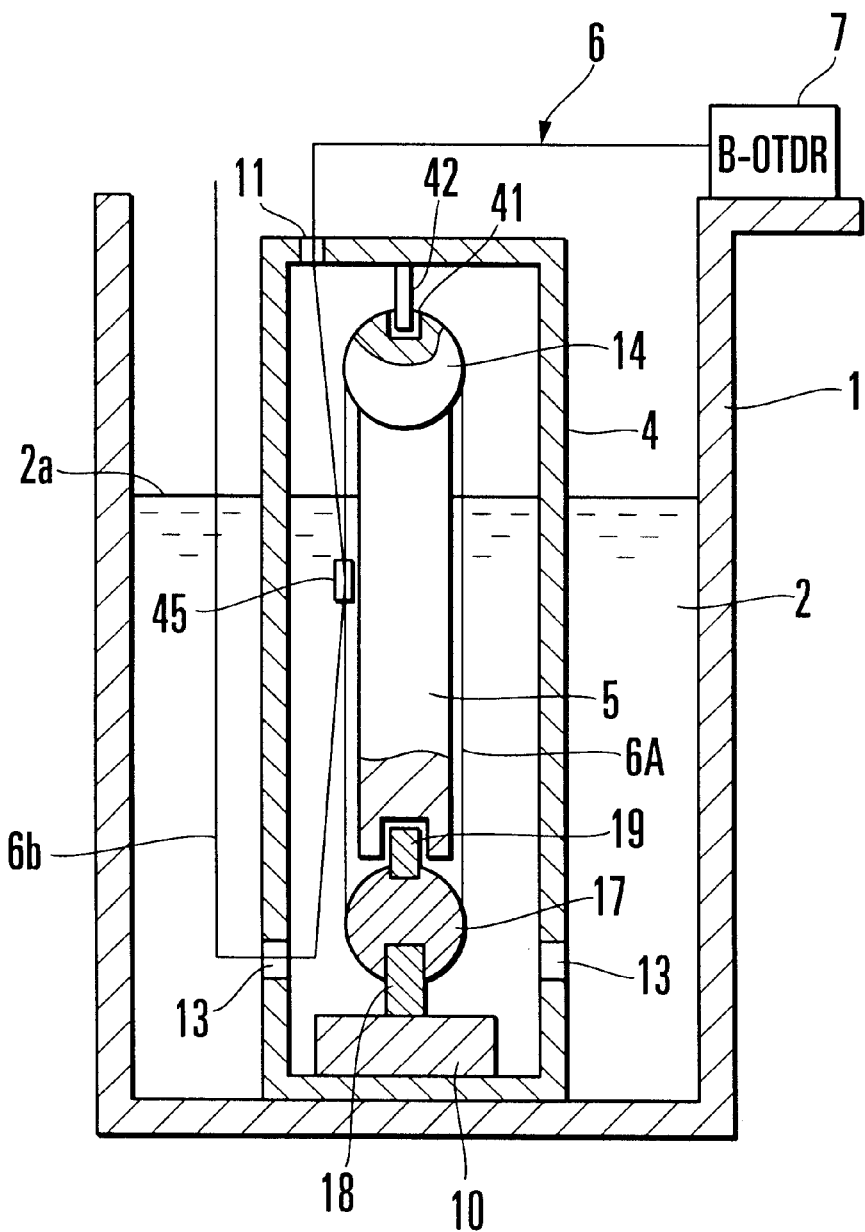
FIG. 8 is a sectional view showing a float type liquid-level gauge according to a fourth embodiment of the invention.

Referring to FIG. 8, there is illustrated a fourth embodiment of the float type liquid-level gauge of the invention in sectional form.

In this embodiment, a strain detector 6A of optical fiber 6 takes a loop form to coil round the peripheral surfaces of optical fiber support members 14 and 17. The opposite ends of the strain detector 6A are fixed by means of a lock member 45 and a terminate end 6b of the optical fiber 6 is passed through a liquid inlet port 13 of a sleeve 4 so as to be led upwardly of a vessel 1.

Figure 9:
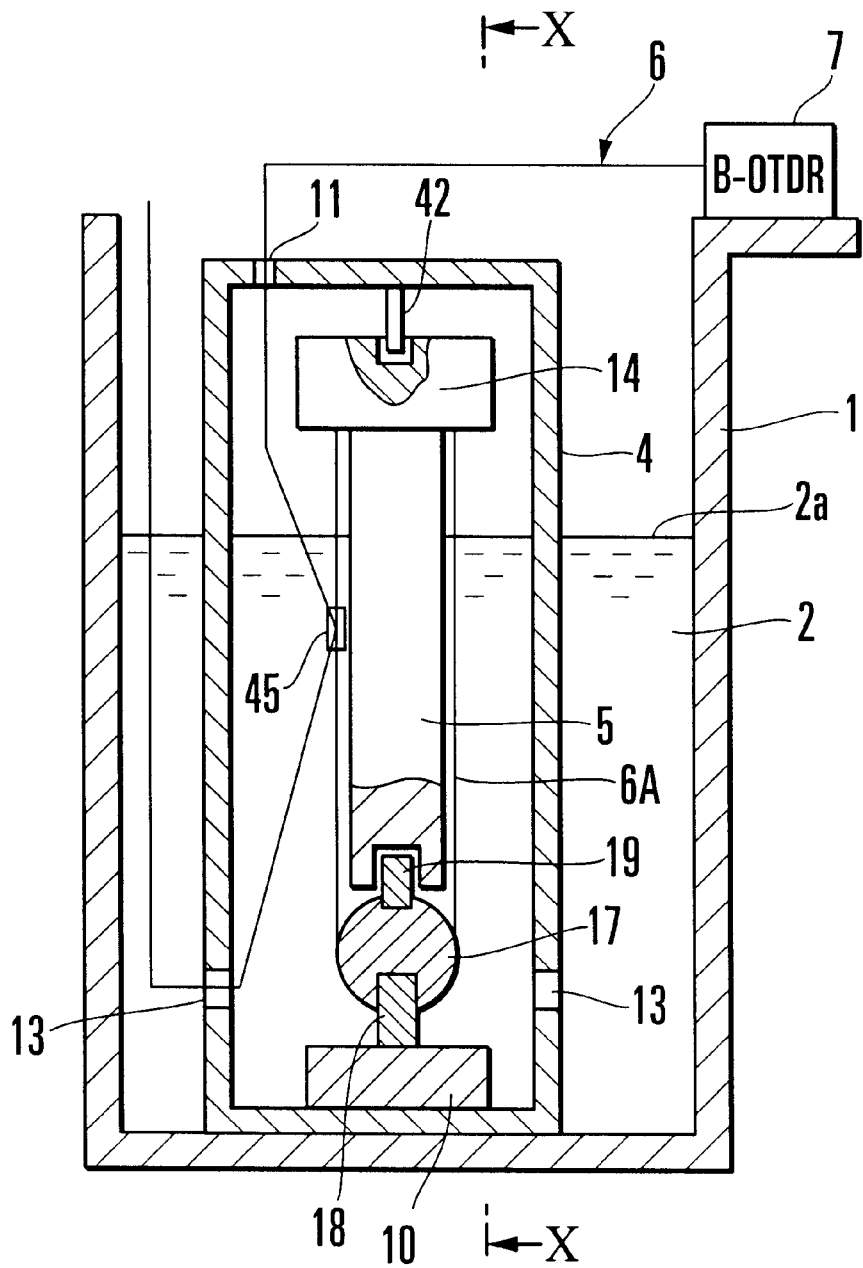
FIG. 9 is a sectional view showing a float type liquid-level gauge according to a fifth embodiment of the invention.
Figure 10:
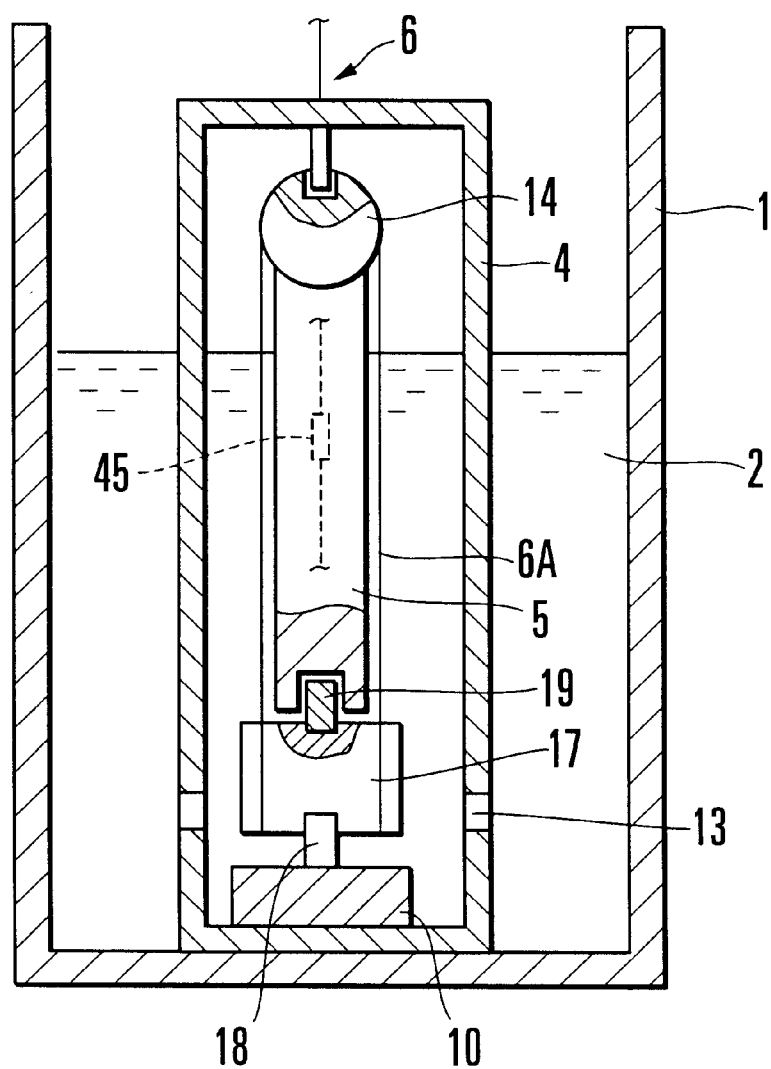
FIG. 10 is a sectional view taken on X—X line of FIG. 9.

In the present embodiment, the strain detector 6A of optical fiber 6 is once turned round at each of the optical fiber support members 14 and 17, with the result that the number of turns of looping is one. But the number of turns of looping can be two or more as in a fifth embodiment shown in FIGS. 9 and 10. Namely, in the fifth embodiment, a strain detector 6A of optical fiber 6 is twice turned round at respective optical fiber support members 14 and 17, with the result of the number of turns of looping is 2. The optical fiber support members 14 and 17 are each made to be columnar and disposed horizontally in mutually 90° different directions so as to be orthogonal to each other.

Obviously, with the construction as above, too, the same effects as those in the embodiment in which the strain detector 6A is simply turned round can be obtained.

Figure 11:
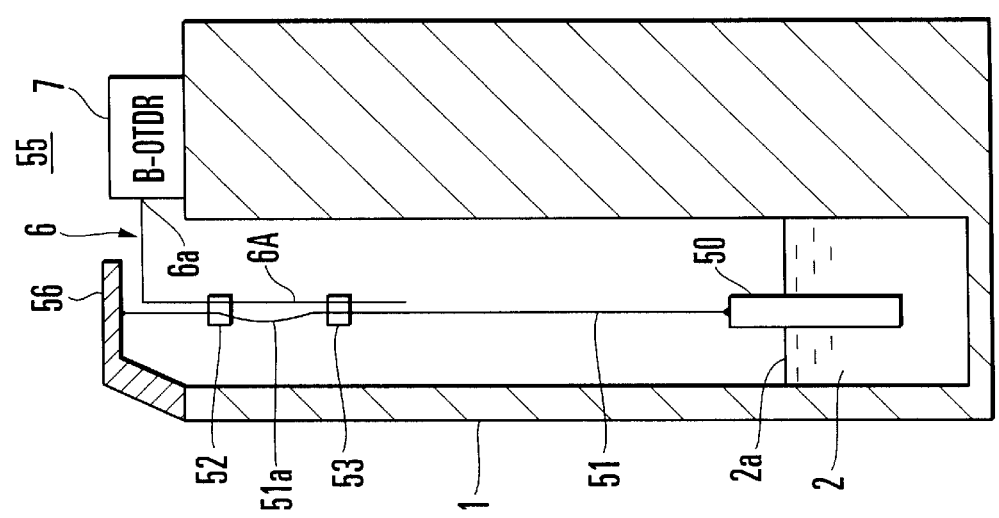
FIG. 11 is a sectional view showing a suspension type liquid-level gauge according to a sixth embodiment of the invention.

Referring to FIG. 11, a sixth embodiment of the invention directed to a suspension type liquid-level gauge is illustrated in sectional form.

In this embodiment, a dipping member (suspension member) 50 that has a specific weight value larger than that of liquid 2 is suspended by a wire 51, with its lower end dipped in the liquid 2. An intermediate portion of optical fiber 6 is fixed to an intermediate portion of the wire 51 by means of two fixing members 52 and 53 and a portion of optical fiber 6 between these fixing members 52 and 53 is used as a strain detector 6A. One end 6a of the optical fiber is connected to a B-OTR 7. A liquid-level gauge as above is called herein a suspension type liquid-level gauge 55.

The optical fiber strain detector 6A is fixed straightforwardly under condition that no initial tension is applied to the fixing members 52 and 53 and is positioned above the liquid 2. The suspension member 50 has a uniform cross-sectional area in the longitudinal or length direction. The wire 51 has its upper end fixed to a support bar 56 and its lower end connected to the upper end of the suspension member 50 in such a manner that a suitable slack is applied to a portion 51a between the fixing members 52 and 53 with the aim of preventing breakage of the strain detector 6A when excessive tension is applied thereto.

In the suspension type liquid-level gauge 55 as above, the suspension member 50 suspended by means of the wire 51 is dipped in the liquid 2. The wire 51 suspending the suspension member 50 is applied with tension. Consequently, tension is also applied to the strain detector 6A of optical fiber 6 and strain is generated inside the detector. When dipped in the liquid 2, the suspension member 50 receives buoyancy from the liquid 2. This buoyancy equals a weight value of liquid 2 excluded by the suspension member 50 and increases as the liquid-level height of the liquid 2 rises but decreases as the height lowers. Since the cross-sectional area of the suspension member 50 is uniform in the longitudinal direction, the magnitude of a change in liquid-level height is accurately proportional to a change in buoyancy acting on the suspension member 50. When the suspension member 50 receives the buoyancy to lighten itself, the tension in the wire 51 is reduced by the magnitude of the buoyancy. Accordingly, tension applied to the strain detector 6A also decreases to reduce strain generated therein. In other words, the tension applied to the strain detector 6A and the strain generated in the strain detector 6A change in inverse proportion to the magnitude of buoyancy. Then, the change in strain is measured by means of the B-OTDR 7.

Strain change amounts and changes in liquid-level height of liquid 2 are measured in advance through experiments to determine the correlation between them, so that by measuring a change in strain, a liquid-level height or a liquid-level change amount of the liquid 2 can be measured accurately as in the case of the float type liquid-level gauge 3.

In the suspension type liquid-level gauge 55 constructed as above, there is no need of dipping the optical fiber 6 in the liquid 2 and the optical fiber 6 can be laid at a location of good environmental condition. Accordingly, the optical fiber 6 is neither eroded nor contaminated by the liquid 2 to improve the durability of the liquid-level gauge and expand the degree of freedom of installation location.

Figure 12:
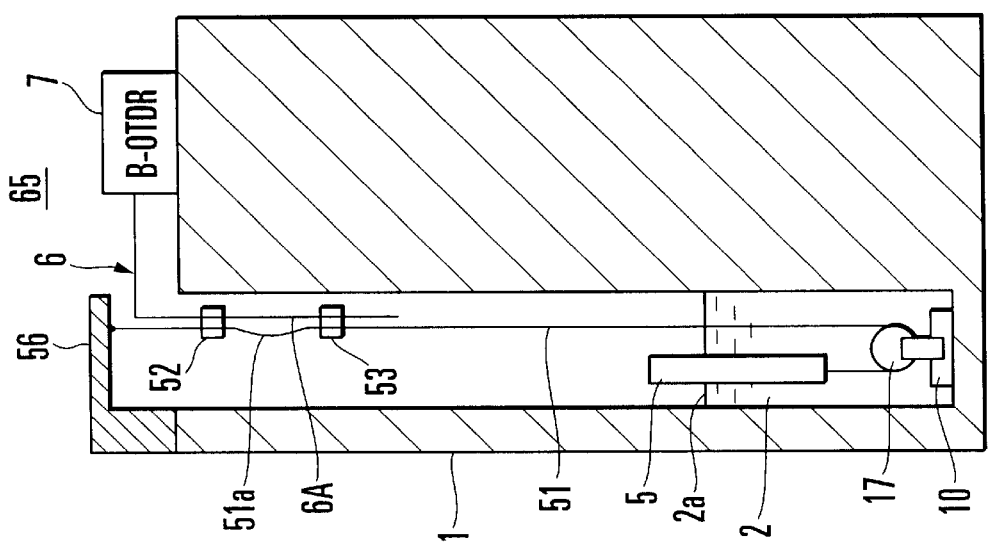
FIG. 12 is a sectional view showing a float type liquid-level gauge according to a seventh embodiment of the invention.

Referring to FIG. 12, there is illustrated, in sectional form, a seventh embodiment of the invention directed to the float type liquid-level gauge.

In the present embodiment, a float 5 having a specific weight value smaller than that of liquid 2 is used in place of the suspension member 50 used in the sixth embodiment as the dipping member to be dipped in the liquid 2, the float 5 is supported by a wire 51 and dipped in the liquid 2 to form a float type liquid-level gauge 65.

The wire 51 has its upper end fixed to a support bar 56 and its lower end dipped in the liquid 2 and turned round upwards by means of a fiber support member 17 provided on bottom 10 of a vessel 1 so as to connect to the lower surface of the float 5. The other structure is the same as that of the sixth embodiment.

When using the float 5, buoyancy increases as the liquid-level height rises like the first to fifth embodiments to generate large tension in the wire 51. Accordingly, large tension is also applied to a strain detector 6A of optical fiber 6 to increase strain generated therein.

In the float type liquid-level gauge 65 as above, too, there is no need of dipping the optical fiber 6 in the liquid 2 and obviously, effects similar to those in the aforementioned suspension type liquid-level gauge 55 can therefore be attained.

As described above, according to the liquid-level gauge according to the invention, the portion of optical fiber where tension is applied and strain is generated is simply turned round or looped and hence the liquid-level gauge can be simplified in construction and reduced in size. Further, load per one optical fiber can be reduced to permit a thin optical fiber of small diameter to be used.

Further, in the sixth and seventh embodiments of the invention, the optical fiber is not dipped in the liquid but laid in good environment condition of atmosphere and hence erosion and contamination of the optical fiber due to the liquid can be prevented to thereby improve durability, reliability and maintainability of the liquid-level gauge.

What is claimed is:

1. A liquid-level gauge comprising a float having a uniform cross-sectional form in the height direction and dipped in liquid, an optical fiber having a support portion of a predetermined length that is applied with tension by supporting said float in such a manner that its upper end always projects from the liquid level, an optical fiber strain gauge for detecting a strain level generated in said support portion of said optical fiber in accordance with a change in liquid-level height, and fiber support members provided at a position engaging the top of said float and a position below the float, respectively, wherein said support portion of said optical fiber is turned round between said fiber support members.

2. A liquid-level gauge according to claim 1, wherein said support portion of said optical fiber is turned round plural times between said fiber support members.

3. A liquid-level gauge comprising a float having a uniform cross-sectional area form in the height direction and dipped in liquid, an optical fiber having a support portion of a predetermined length that is applied with tension by supporting said float in such a manner that its upper end always projects from the liquid level, an optical fiber strain gauge for detecting strain generated in said support portion of said optical fiber in accordance with a change in liquid-level height, and fiber support members provided at a position engaging the top of said float and a position below said float, respectively, wherein said support portion of said optical fiber is formed into a loop form between said fiber support members and fixed at its opposite ends by means of a lock member.

4. A liquid-level gauge according to claim 3, wherein said optical fiber support portion is turned round plural times between said fiber support members so as to be formed into a loop form.

* * * * *